(12) United States Patent
Wang

(10) Patent No.: US 11,602,842 B2
(45) Date of Patent: Mar. 14, 2023

(54) LIFTING ROBOT AND ROBOT SYSTEM

(71) Applicant: BEIJING GEEKPLUS TECHNOLOGY CO., LTD., Beijing (CN)

(72) Inventor: Kun Wang, Beijing (CN)

(73) Assignee: BEIJING GEEKPLUS TECHNOLOGY CO., LTD., Beijing (CN)

(*) Notice: Subject to any disclaimer, the term of this patent is extended or adjusted under 35 U.S.C. 154(b) by 598 days.

(21) Appl. No.: 16/609,187

(22) PCT Filed: Aug. 23, 2018

(86) PCT No.: PCT/CN2018/101942
§ 371 (c)(1),
(2) Date: Oct. 28, 2019

(87) PCT Pub. No.: WO2019/109672
PCT Pub. Date: Jun. 13, 2019

(65) Prior Publication Data
US 2020/0086481 A1 Mar. 19, 2020

(30) Foreign Application Priority Data
Apr. 28, 2018 (CN) .......................... 201810398922.0

(51) Int. Cl.
*B25J 9/16* (2006.01)
*B25J 13/00* (2006.01)
(Continued)

(52) U.S. Cl.
CPC ............. *B25J 9/1617* (2013.01); *B25J 5/007* (2013.01); *B25J 13/00* (2013.01); *B25J 15/0608* (2013.01); *B25J 19/02* (2013.01)

(58) Field of Classification Search
CPC . B25J 9/1617; B25J 5/007; B25J 13/00; B25J 15/0608; B25J 19/02; B66F 3/44;
(Continued)

(56) References Cited

U.S. PATENT DOCUMENTS 5,015,146 A * 5/1991 Barnes ...................... B66F 7/22
414/628
5,975,837 A * 11/1999 Focke .................... B65G 47/90
414/792.9
(Continued)

FOREIGN PATENT DOCUMENTS

| CN | 105016245 A | 11/2015 |
|---|---|---|
| CN | 105417434 A | 3/2016 |

(Continued)

OTHER PUBLICATIONS

MIT inventor unleashes hundreds of self-assembling cube swarmbots (Year: 2013).*
(Continued)

*Primary Examiner* — B M M Hannan
(74) *Attorney, Agent, or Firm* — ArentFox Schiff LLP

(57) ABSTRACT

Disclosed is a lifting robot that includes a housing and a tray. The housing includes a side wall formed by a plurality of enclosing side panels, a projection of the side wall on a horizontal plane is a regular polygon, and at least one of the plurality of side panels is provided with a connection device for connecting to a side panel of another lifting robot. Further disclosed is a robot system including a plurality of the lifting robot described above.

20 Claims, 4 Drawing Sheets

(51) Int. Cl.
  *B25J 15/06* (2006.01)
  *B25J 19/02* (2006.01)
  *B25J 5/00* (2006.01)
(58) Field of Classification Search
  CPC .......... B66F 9/063; B66F 3/46; B66F 7/0625; B66F 7/28
  USPC ........................................................ 700/218
  See application file for complete search history.

(56) References Cited

U.S. PATENT DOCUMENTS

| | | | |
|---|---|---|---|
| 7,559,737 B2* | 7/2009 | Ray | B65G 61/00 414/793 |
| 7,750,818 B2* | 7/2010 | Lee | H01L 21/68742 414/935 |
| 2011/0029133 A1* | 2/2011 | Okazaki | B25J 9/0087 700/258 |
| 2011/0037041 A1* | 2/2011 | DeJong | B66F 3/46 254/89 R |
| 2011/0266076 A1* | 11/2011 | Morey | B62D 55/06 901/1 |
| 2012/0018688 A1* | 1/2012 | Finkbeiner | B66F 7/28 254/1 |
| 2012/0152877 A1* | 6/2012 | Tadayon | B25J 11/0085 901/30 |
| 2014/0264203 A1* | 9/2014 | Elliott | B66F 3/46 254/89 R |
| 2016/0334801 A1* | 11/2016 | Ratanaphanyarat | B25J 5/007 |
| 2018/0194604 A1* | 7/2018 | Elliott | B66F 7/28 |
| 2020/0013285 A1* | 1/2020 | Wang | B60P 3/22 |
| 2020/0024853 A1* | 1/2020 | Furrer | B25J 19/021 |
| 2020/0338739 A1* | 10/2020 | Freire | B25J 5/02 |
| 2021/0078165 A1* | 3/2021 | Tang | B62D 57/024 |

FOREIGN PATENT DOCUMENTS

| | | | |
|---|---|---|---|
| CN | 206336985 U | | 7/2017 |
| CN | 206767536 U | | 12/2017 |
| CN | 207620459 U | * | 7/2018 |
| CN | 108383030 A | | 8/2018 |
| CN | 208150872 U | | 11/2018 |
| EP | 3210931 A1 | | 8/2017 |
| JP | H08207775 A | | 8/1996 |
| JP | 2009501685 A | | 1/2009 |
| WO | 2007011871 A2 | | 1/2007 |
| WO | 2016125000 A1 | | 8/2016 |

OTHER PUBLICATIONS

Reconfigurable and Self-Assembling Robots—The Way of the Future (Year: 2013).*
International Search Report for PCT/CN2018/101942 dated Feb. 1, 2019, with English Translation.

* cited by examiner

LIFTING ROBOT AND ROBOT SYSTEM

CROSS-REFERENCE TO RELATED APPLICATIONS

This is a U.S. National Stage Application of International Patent Application No. PCT/CN2018/101942, filed on Aug. 23, 2018, which claims priority to Chinese Patent Application No. 201810398922.0, filed on Apr. 28, 2018, the contents of which are incorporated herein by reference in their entireties.

TECHNICAL FIELD

The present disclosure relates to automated machinery equipment, and more particularly relates to a lifting robot and a robot system.

BACKGROUND

As robot technology continues to develop, intelligent robots have been widely used in various fields including manufacturing, automated warehouse logistics, and so on. The intelligent robots not only reduce the labor intensity of workers, but improve production efficiency, reduce production costs, which greatly meets people's production needs.

A lifting robot is an intelligent robot commonly used in manufacturing and warehouse logistics. Such kind of robot achieves material handling by way of lifting materials. In particular, the lifting robot reaches a designated position by autonomous navigation, and changes its direction of movement by a driving wheel mechanism so as to accurately reach a position right under the material to be transported. A lifting mechanism inside the robot drives a tray on the top of the robot to rise to lift up the material. Then the robot rotates its chassis and changes its direction of movement. When it reaches a designated position, the lifting mechanism inside the robot drives the tray on its top to descend so as to unload the material, thereby completing the material handling process.

SUMMARY

When a lifting robot in the related art is carrying materials, one type of robot usually corresponds to one material size range and load range because the size and the bearing load of the robot are limited. As such, when a customer has a complex application scenario the load and volume of the robot may need to be flexibly adjusted. In this case, multiple types of robots with various sizes and load capacities would be required, resulting in a waste of equipment. In addition, due to different shapes and sizes of the materials, there will be special-shaped parts with irregular bottoms. Thus, special types of lifting robots would need to be customized for the unloading platform. When handling different types of materials, different types of lifting robots would be needed, leading to a waste of resources and time, which is not conducive to the system scheduling and control and improving the production efficiency.

The present application provides a lifting robot to improve the versatility of lifting robots thereby reducing repeated investment in robot equipment by enterprises.

The present application provides a robot system which reduces the system cost and improves the system scheduling and control flexibility as well as production efficiency.

The present application provides a lifting robot which includes a housing and a tray.

The housing includes a side wall formed by multiple enclosing side panels. A projection of the side wall on a horizontal plane is a regular polygon. At least one of the multiple side panels is provided with a connection device for connecting to a side panel of another lifting robot.

In an embodiment, the connection device is a magnetic tile.

In an embodiment, the lifting robot further includes a lifting mechanism configured to enable the tray to raise or lower any height within a preset stroke range.

In an embodiment, the regular polygon is a square or a regular hexagon.

In an embodiment, the number N of the multiple side panels of the side wall is such that $2N/(N-2)$ is an integer.

In an embodiment, a projection of the tray on the horizontal plane has a same shape as a projection of the side wall.

In an embodiment, the lifting robot further includes an information transmission module configured to enable internal and external communication of the lifting robot. The information transmission module includes a data interface disposed on at least one of the multiple side panels.

In an embodiment, the lifting robot further includes a display module which includes:

an operation display module, which is configured to display whether the lifting robot is operating; and a lifting display module, which is configured to display whether the lifting robot is lifting a material.

In an embodiment, the lifting robot further includes a detection mechanism which includes a material detection module configured to detect material information. The material information includes at least one selected from the group consisting of: position information, size information and bottom surface shape information.

In an embodiment, the detection mechanism further includes:

a lifting detection module, which is configured to detect a distance between the tray and a bottom surface of the material, and a lifting state of the tray.

A robot system includes a multiple of the lifting robot described above. At least one side panel of each lifting robot is connected to a side panel of another lifting robot in the robot system by the connection device.

In an embodiment, in response to the multiple lifting robots lifting a same material, trays of the multiple lifting robots have different lifting heights.

The present application has following beneficial effects.

In the lifting robot provided by the present application, the side wall is arranged as a regular polygon and each side panel of the lifting robot is operative to be attached to a side panel of another lifting robot, so that multiple lifting robots may be combined into a lifting robot group, thereby improving the versatility of the lifting robot, reducing the resource input of enterprises and improving the of the scheduling and control flexibility of the lifting robot. By setting the connection device, multiple lifting robots can be closely connected to each other, which facilitate the simultaneous movement as well as scheduling control of the lifting robot group.

The robot system provided in the present application may select the number and combination mode of the lifting robots to be combined according to the size and weight of the material required to be lifted by using a multiple of the above-mentioned lifting robot, which improves the lifting ability of the lifting robot to lift the material whereby the system does not need to set up multiple types of robot models, thereby reducing the overall investment of the

Figure 1:
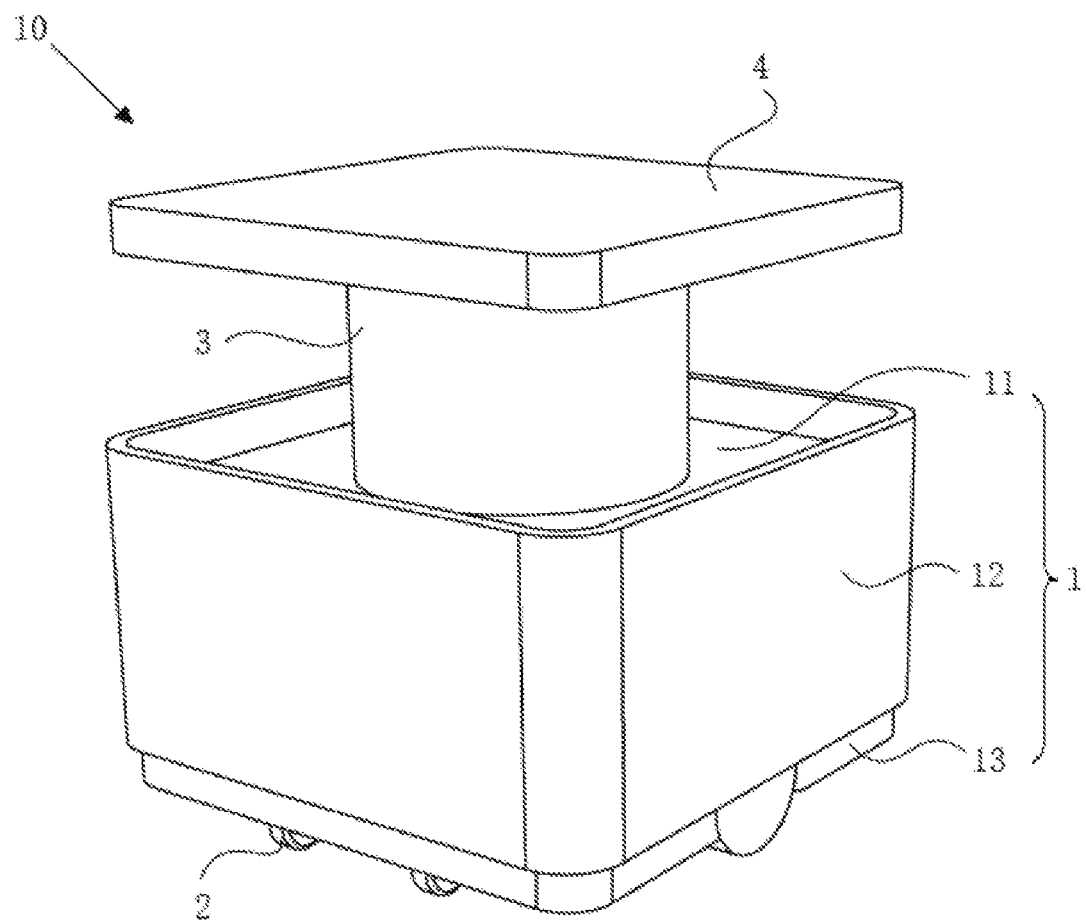
FIG. 1 is a schematic diagram of a square lifting robot according to an embodiment of the present application.

Reference numbers used in the drawings are listed as follows:

- 10—Lifting robot; 20—Material;
- —Housing; 11—Top panel; 12—Side wall; 13—Bottom panel;
- 2—Driving wheel mechanism;
- 3—Lifting mechanism; 31—Lifting driving component; 32—Lifting rod;
- 4—Tray.
- 100—control mechanism;
- 101—information transmission module;
- 102—display module;
- 1021—operation display module; 1022—lifting display module;
- 103—identification module;
- 104—power module; 105—navigation module; 106—alarm module; 107—main control module.

DETAILED DESCRIPTION

As illustrated in FIG. 1, the present application provides a lifting robot 10. The lifting robot 10 is configured to lift and carry a material 20 in manufacturing, warehouse logistics or other fields. The lifting robot 10 includes a housing 1, a driving wheel mechanism 2 disposed at the bottom of the housing 1, a tray 4 disposed on the top of the housing 1, a lifting mechanism 3 disposed within the housing 1 and configured to lift the tray 4, a control mechanism 100, and a detection mechanism. The housing 1 is configured to form an external shape, an internal installation space, and installation and connection positioning. The driving wheel mechanism 2 is configured to drive the lifting robot to advance and steer, whereby the lifting robot 10 move or turn to a specific position. The tray 4 is configured to lift a material. The lifting mechanism 3 is configured to make the tray 4 raise or descend to achieve material lifting or state return. The control mechanism 100 is configured to control the operating state of the lifting robot 10. The detection component is configured to detect the operating state of the lifting robot 10 and the external environmental state.

In an embodiment, as illustrated in FIG. 1, the housing 1 includes a bottom panel 13, a side wall 12 and a top panel 11. The bottom panel 13 is parallel to the top panel 11. The bottom panel 13 is disposed at the bottom of the side wall 12.

The top panel 11 is disposed at the upper end of the side wall 12. The bottom panel 13, the side wall 12 and the top panel 11 enclose with each other to form a receiving chamber which accommodates the lifting mechanism 3.

In an embodiment, referring to FIG. 1, a projection of the housing 1 on the horizontal plane is a square, and the housing 1 forms a square lifting robot 10 in appearance. Correspondingly, the tray 4 also forms a square that matches the housing 1. The side wall 12 is composed of multiple side panels which are connected end to end. This kind of configuration may enable the side panels of two or more lifting robots 10 to be attached to each other, so that when multiple lifting robots are combined together, the multiple lifting robots may form different combined structures in appearance depending on the combination relationships between the multiple lifting robots. Therefore, lifting surfaces with different shapes and sizes may be formed depending on the number and combination mode of lifting robots 10, and the structure of the combined lifting robot group may be compact and orderly. When multiple combined lifting robots 10 cooperate together, the formed lifting surface may lift the same material 20. The number and combination mode of the lifting robots 10 to be combined may be selected according to the shape and size of the lifted material 20, so that the combined lifting surface may adapt to the shape of the lifted material 20 or may bear corresponding loads, thereby achieving the lifting of materials 20 with different shapes and different weights. This robot system including multiple lifting robots 10 may flexibly adjust the size, the load capability, and the lifting surface shape of the combined lifting robot 10, so that there is no need to set additional robot models with various sizes and load capabilities for the robot system, or to configure special robot models according to the special-shaped parts. Furthermore, there may be no need to change robot models in a material handling process, thereby reducing the system input cost, increasing the flexibility of system scheduling and control and improving the production efficiency.

Figure 2:
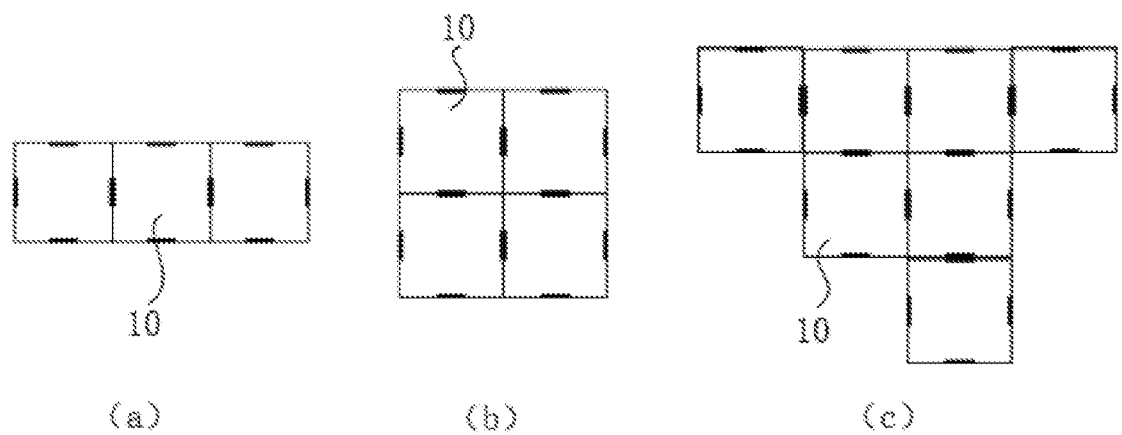
FIG. 2 is a schematic diagram of different combinations of a square lifting robot group according to an embodiment of the present application.

FIG. 2 shows schematic diagrams of different combinations of a square lifting robot group according to an embodiment of the present application. In FIG. 2, (a) is a schematic diagram of a combination of three lifting robots 10, (b) is a schematic diagram of a combination of four lifting robots 10, and (c) is a schematic diagram of a combination of seven lifting robots 10.

Of course, since the number of side panels of the lifting robot is not limited to four, the shape of the lifting robot is not limited to a square. When the number of the side panels is N, N may meet the condition that $2N/(N-2)$ is an integer. That is, when the lifting robot 10 has N side panels, each side panel may be attached to a side panel of another lifting robot with the same shape, and each edge may be provided with $2N/(N-2)-1$ lifting robots 10, so that the $2N/(N-2)$ lifting robots 10 may be tightly combined in a circumferential way with the edge as a central axis.

Figure 3:
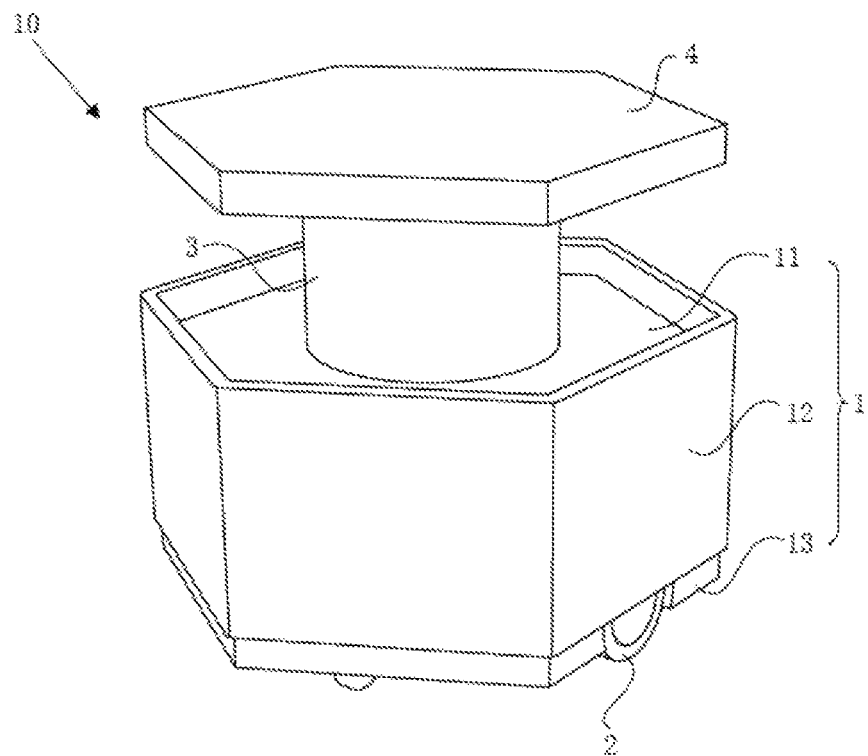
FIG. 3 is a structural diagram of an orthohexagonal lifting robot according to an embodiment of the present application.

FIG. 3 is a structural diagram of an orthohexagonal lifting robot according to an embodiment of the present application. As can be seen from FIG. 3, a structure of the orthohexagonal lifting robot 10 is the same as the structure of the square lifting robot 10, except that the number of side panels of the side wall 12 are different, that is, their projection of the side wall 12 on the horizontal plane is different.

Figure 4:
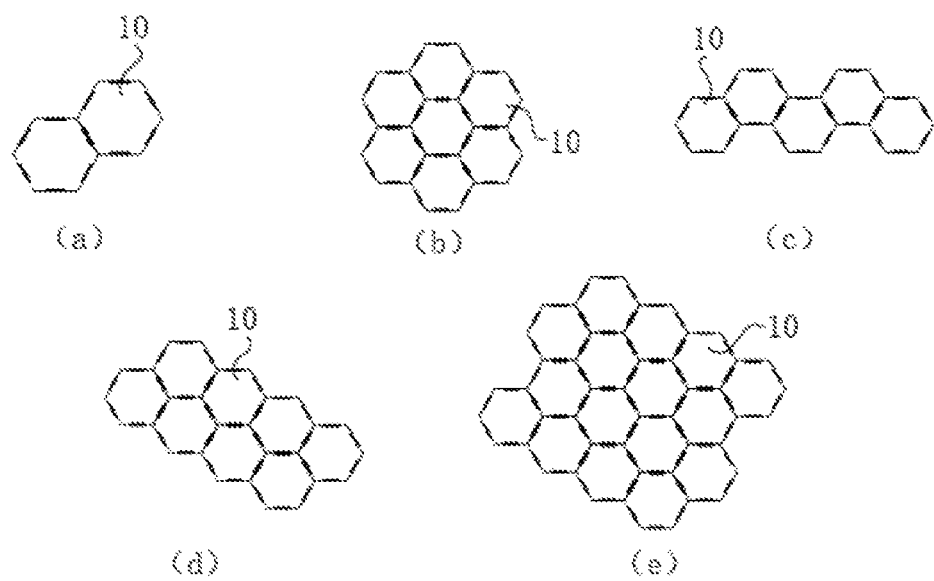
FIG. 4 is a schematic diagram of different combinations of an orthohexagonal lifting robot group according to an embodiment of the present application.

FIG. 4 is a top view of different combinations of an orthohexagonal lifting robot group according to an embodiment of the present application. At this time, N=6. In FIG. 4, (a) is a schematic diagram of a combination of two lifting robots 10, (b) is a schematic diagram of a combination of seven lifting robots 10, (c) is a schematic diagram of a combination of five lifting robots 10, (d) is a schematic diagram of a combination of eight lifting robots 10, and (e) is a schematic diagram of a combination of sixteen lifting robots 10. The combination forms of different numbers of lifting robots 10 are not limited to the forms illustrated in FIGS. 2 and 4.

As illustrated in FIGS. 2 and 4, in this embodiment, the number N of side panels is equal to the maximum number of other lifting robots to which the side wall 12 of each lifting robot 10 may be attached. Each side panel of each lifting robot 10 may choose to be attached or not attached to other lifting robots 10. It may be seen that the bigger N is, the more combination forms of multiple lifting robots 10 there are and the more styles of lifting surface may be obtained, thereby providing greater control flexibility of the lifting robot. In the present application, the value of N may be 3, 4 or 6. When N is 3, since the side wall 12 is formed by only three enclosing side panels, the enclosed receiving chamber of the lifting robot 10 is relatively small when the area of the side wall 12 is fixed, which is not beneficial to the arrangement of the lifting mechanism. Therefore, in this embodiment, N may be 4 or 6.

In this embodiment, the size and the shape of each side panel of the side wall 12 is set to be the same. In other embodiments, the area or the shape of each side wall 12 may be different, as long as the inner included angles between adjacent side panels are the same and the side panels are flat. That is, the above-described function that multiple lifting robots 10 can be combined with each other can be achieved as long as the projection of the side wall 12 on the horizontal plane is a regular polygon.

In order to allow the multiple combined lifting robots 10 to be firmly integrated with each other, each side panel of the lifting robot 10 is provided with a connection device. In this embodiment, the connection device includes a magnetic tile. The magnetic tile is typically disposed on the inner surface of the side panel and the position of the magnetic tile on each side panel is the same. Thereby, when the lifting robot 10 is combined with the other lifting robots 10, magnetic tiles on any two side panels correspond to each other in position so that they can be easily aligned.

In this embodiment, the connection device is a magnetic tile. The magnetic tile has a simple structure and can be easily arranged, which does not affect the shape or the appearance of the lifting robot 10. Since the magnetic tile has a magnetic property, it may magnetically attract a closer lifting robot 10. The lifting robot 10 may be guided to automatically attach to an adjacent robot, and there is no need to connect the lifting robots 10 manually. This operation is simple, and is beneficial to automatically control the lifting root 10. In other embodiments, the connection device may also be implemented as other devices which may stably connect two lifting robots 10.

Figure 5:
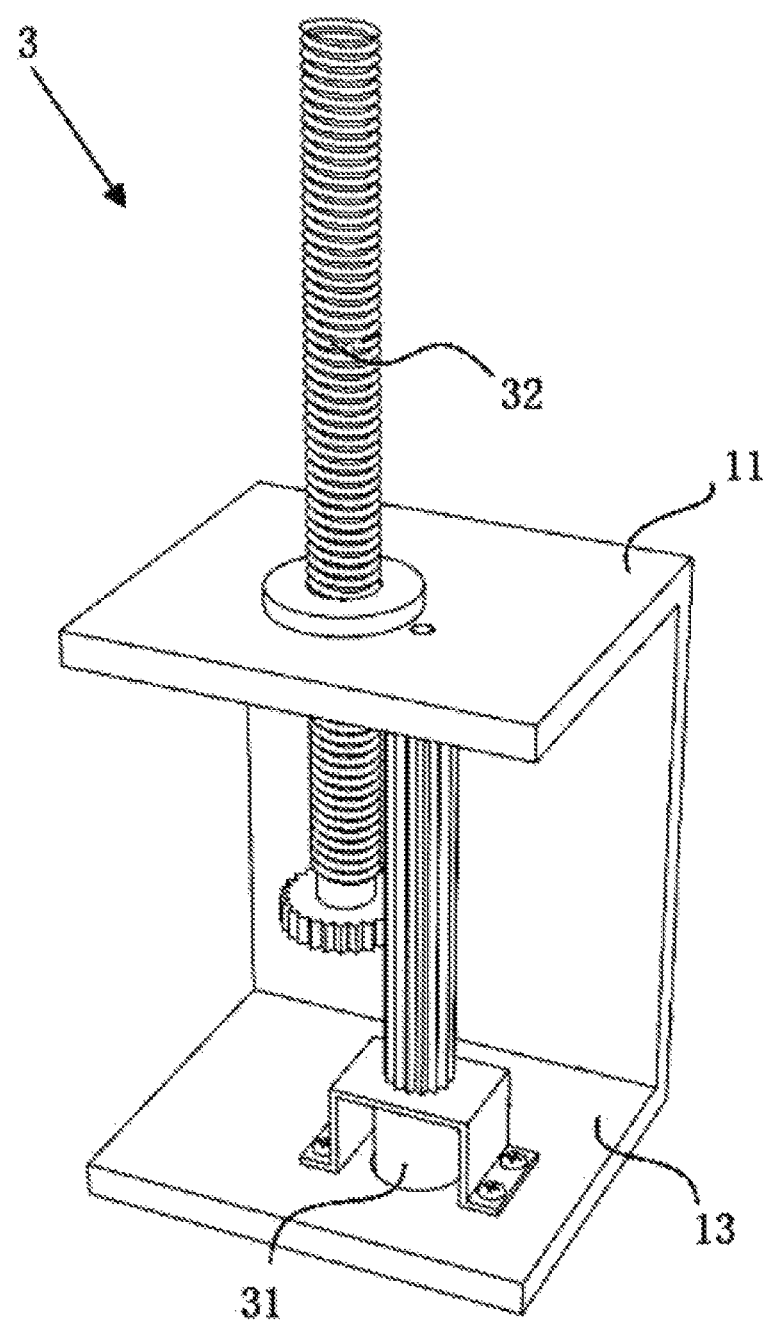
FIG. 5 is a structural diagram of a lifting mechanism according to embodiment of the present application.

In order to implement the operation and carrying function of the lifting robot 10, the lifting robot 10 is provided with a driving wheel mechanism 2 and a lifting mechanism 3. FIG. 5 is a structural diagram of a lifting mechanism 3 according to an embodiment of the present application. The lifting mechanism 3 includes a lifting driving component 31 and a lifting rod 32. The lifting driving component 31 is disposed on the bottom panel 13. The lifting rod 32 is vertically disposed with one end connected to the lifting driving component 31 and another end connected to the tray 4. The lifting driving component 31 drives the lifting rod 32 to vertically raise or descend to raise or lower the tray 4. In this embodiment, the lifting rod 32 is a lead screw. The lifting driving component 31 includes a lifting driving motor and a connection member connected between the lifting driving motor and the lead screw. The connection member may be a worm and worm gear assembly, or may be other structures which may implement the conversion of the rotation of the lifting driving motor into a lifting motion of the lead screw. In order to enable the lifting driving motor to better drive the lifting rod 32 into motion, an output end of the driving motor may be connected to a decelerator.

In this embodiment, the lifting mechanism 3 may be the lifting driving motor and the lead screw, or may be other mechanism which may drive the lifting motion of the tray 4. This embodiment does not limit the specific structure of the lifting mechanism 3.

In this embodiment, the driving wheel mechanism 2 may be in the form of differential driving, and includes a driving wheel motor, two driving wheels and a connection component connecting the driving wheel motor and the two driving wheels. The two driving wheels are respectively disposed on two sides of the lifting mechanism symmetrically, and the axis of the two driving wheels is perpendicular to the axis of the lifting rod 32. The driving wheel motor is fixed on the bottom panel 13, and its rotation output shaft is connected to the driving wheel to enable the driving motor to drive the driving wheel to rotate, so as to drive the lifting robot 10 to horizontally move or take a turn. In this embodiment, one driving wheel is correspondingly provided with a driving wheel motor and a set of connection components, so that the lifting robot 10 may implement different motion forms by separately controlling the two driving wheels. In order to enable the lifting robot 10 to turn smoothly, the driving wheel mechanism 2 further includes a driven wheel component. The driven wheel component may include at least two universal wheels. The line of the two universal wheels is perpendicular to the line of the two driving wheels, and the distance between the two universal wheels may be slightly greater than the distance between the two driving wheels, thereby enabling the lifting robot 10 to turn more smoothly and preventing the lifting robot 10 from tipping over toward one side.

In this embodiment, the driving wheel mechanism 2 using the differential driving drives the lifting robot 10 to move. However, in practice, the lifting robot 10 may also adopt other driving wheel mechanisms 2 which may drive the lifting robot 10 to horizontally move and turn. This embodiment does not limit the specific driving wheel mechanism 2 adopted by the lifting robot 10.

The tray 4 is above the top panel 11, is connected to the upper end of the lifting rod 32, and is driven by the lifting rod 32 to raise and descend. The upper surface of the tray 4 is configured to be in contact with the material 20 and lift the material 20. The upper surface of the tray 4 may be provided with a friction material, such as rubber, to increase the friction between the tray 4 and the bottom of the material 20, thereby facilitating the lifting robot 10 to better lift and carry the material 20. In order to increase the lifting area of the tray 4 of a single lifting robot 10, the projection of the tray 4 on the horizontal plane may totally coincide with the projection of the side wall 12.

Figure 6:
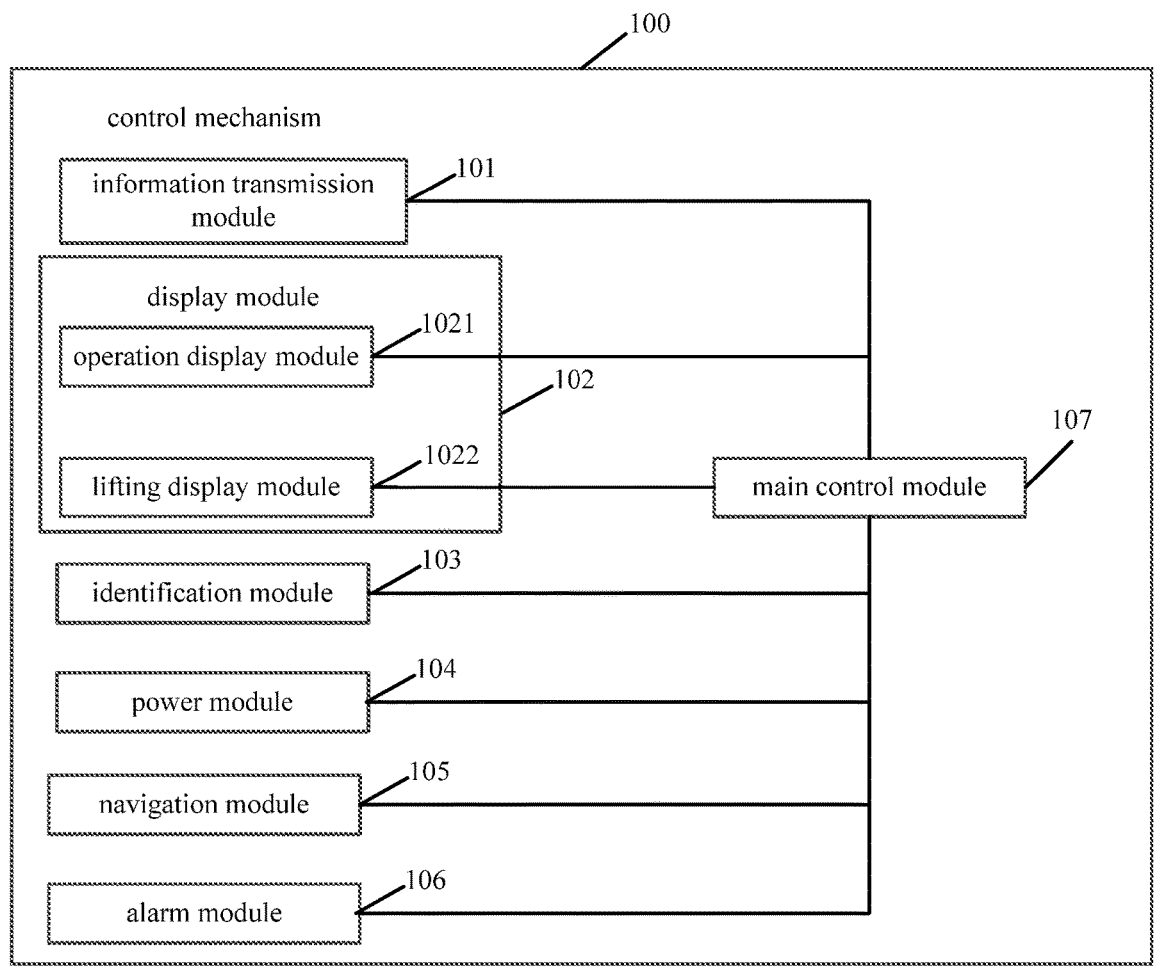
FIG. 6 is a structural diagram of a control mechanism according to embodiment of the present application.

In order to implement the control and regulation of the movement of the lifting robot 10, the lifting robot 10 is provided with a control mechanism 100. As illustrated in FIG. 6, the control mechanism 100 includes an information transmission module 101, a control main control module 107, a display module 102, an identification module 103, a power module 104, a navigation module 105, and an alarm module 106. The information transmission module 101, the display module 102, the identification module 103, the power module 104, the navigation module 105, and the alarm module 106 are each connected to the main control main control module 107. The main control module 107 is configured to process and calculate various types of information, thereby regulating the operating state of the lifting robot 10.

The information transmission module 101 is configured to enable internal and external communication of the lifting robot 10. The information transmission module 101 is connected to the driving wheel mechanism 2 and to the lifting mechanism 3. The information transmission module 101 may receive an external operating instruction, transmit the external operating instruction to the main control main control module 107 for processing, and transmit the processed external operating instruction to the corresponding driving wheel mechanism 2 or lifting mechanism 3, thereby controlling the movement of the driving wheel mechanism 2 or the lifting mechanism 3. The transmission of the external operating instruction may be performed by setting a switch button connected to the control mechanism 100 on the lifting robot 10, there achieving the starting or stopping of the driving wheel mechanism 2 by opening or closing the switch button. Alternatively, a remote controller can be used to send a driving signal to the control mechanism 100 to achieve the starting or stopping of the driving wheel mechanism 2, for example, a control signal may be sent from a main control terminal of the entire robot system to a control mechanism 100 of a single robot.

In order to make the operating state of the multiple combined lifting robots more coordinate, the lifting robots 10 may communicate internally through the information transmission module 101 to share information between adjacent lifting robots 10 and to maintain the internal information among the lifting robots 10 coordinated and consistent, thereby facilitating the overall adjustment of the combined lifting robots 10 and simplifying the control complexity of the robot system. In order to facilitate the internal information transmission between the adjacent two lifting robots 10, each side panel of the lifting robot 10 is provided with a data interface for internal communication. The internal and external information transmission of the lifting robot 10 may adopt a wired transmission manner, or may adopt a wireless transmission manner, and the wireless transmission manner is preferable.

The display module 102 is configured to display the operating state of the lifting robot 10. The display module 102 includes an operation display module 1021 configured to display whether the lifting robot 10 is operating and a lifting display module 1022 configured to display whether the lifting robot 10 is lifting a material. The operation display module 1021 and the lifting display module 1022 may be implemented as a state indicator light, so that the operator can determine whether the lifting robot 10 is started or whether the lifting robot 10 is lifting a material through the extinguishing or lighting of the state indicator light, or may determine the state of motion of the lifting robot 10 through different patterns displayed by the state indicator light in different states. The display module 102 further includes a combined display module 102 configured to display whether the lifting robot 10 is connected to and communicates with other lifting robots and a power display module 102 configured to display a power state of the lifting robot 10.

The identification module 103 is configured to identify external environmental information, and convert the external environment information into a form of information which the main control module 107 may process. The power module 104 is configured to control the power of a single robot. In order to enable the robot work for a long time, the power module 104 set on the lifting robot 10 includes a rechargeable battery, a charging port, and a power supply on-off circuit. The navigation module 105 is configured to plan and navigate the operating path of the lifting robot 10 to enable the lifting robot 10 to move correctly to a predetermined position. The alarm module 106 is configured to alarm an abnormal state of the lifting robot 10 to enable the worker to find the error in time. The alarm module 106 may be one or a combination of a buzzer, a voice broadcaster, and an LED. In order to identify and control each lifting robot 10, each lifting robot 10 has a unique number.

In order to better control the movement of the lifting robot 10 according to the operating state of the lifting robot 10 and an external environmental state, the lifting robot 10 is further provided with a detection mechanism. The detection mechanism includes a first detection component configured to detect an external environment and a second detection component configured to detect the operating state of the lifting robot 10.

The first detection component may include an environment detection module configured to capture external environmental information, an obstacle avoidance sensor configured to detect an obstacle, and a material detection module configured to detect position information, a bottom shape and a size of a material 20. The environment detection module and the material detection module may adopt a camera. The camera may include at least one of a two-dimensional code scanning module and a barcode scanning module that are configured to scan the information of the material 20. The camera may scan two-dimensional code information or barcode information preset on the material 20, and transmit the scanned information to the identification module 103 of the control mechanism 100. The information is parsed and recognized by the identification module 103 and is transmitted to the main control module 107 for processing, thereby controlling the operation of the lifting robot 10. The obstacle avoidance sensor may be at least one of an infrared sensor, a LIDAR sensor or an ultrasonic detector. The obstacle avoidance sensor is connected to the information transmission module 101. The detected obstacle information is transmitted by the information transmission module 101 to the main control module 107 for processing. The main control module 107 controls the lifting robot 10 to avoid obstacles.

The second detection component includes a driving wheel detection module configured to detect the driving wheel mechanism 2 and a lifting detection module configured to detect the operating state of the lifting mechanism 3. The driving wheel detection module may include an angle sensor and/or a displacement sensor. The lifting detection module may include a displacement sensor or a distance sensor configured to detect a lifting height of the lifting mechanism 32, a distance sensor configured to detect a distance between the tray 4 and the bottom surface of the material 20, and the link. The lifting detection module may enable the control mechanism 100 to control the lifting height of the tray 4 by detecting the distance between the tray 4 and the material 20. Such control may be that the main control module 107 calculates the height of the lifting rod 32 according to the detected information and controls the movement of the lifting mechanism 3, or may be that the main control module 107 directly controls the movement of the lifting rod 32 in the lifting mechanism 3 until the tray 4 abuts against the material 20 and controls the lifting mechanism 3 to stop moving.

Figure 7:
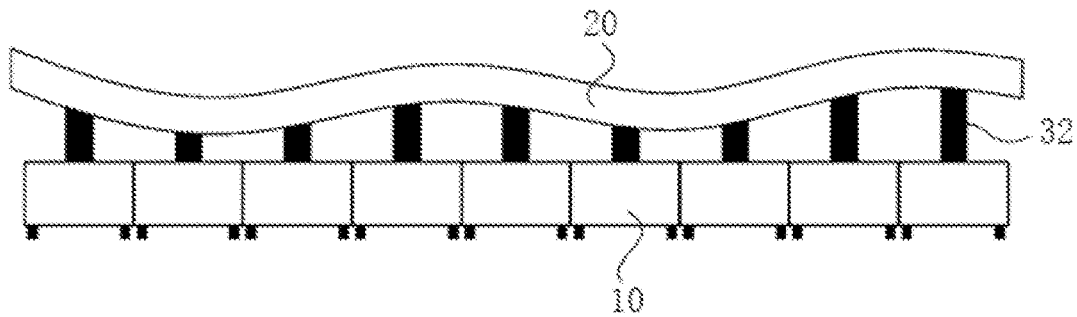
FIG. 7 is a front view of a lifting robot group lifting a material with a special-shaped bottom surface according to an embodiment of the present application.

Whether for a single lifting robot 10 or a combined lifting robot group, the lifting height of the tray 4 of the single lifting robot 10 may be controlled in the manner described above. For the combined lifting robot group, when the bottom surface of the material 20 is a plane, since each lifting robot 10 has the same distance from the bottom surface of the material 20, the main control terminal may be used to adjust the lifting heights of the lifting robots 10 to be uniform. In this way, the lifting robot group obtains a flat top lifting surface. At this time, the height lifted by each lifting robot 10 is not required to be calculated when adopting the manner of the main control terminal presetting the lifting height, so that the control is unified, simple and convenient. FIG. 7 is a front view of a lifting robot group lifting a material with a special-shaped bottom surface according to an embodiment of the present application. As illustrated in FIG. 7, when the material 20 is a material with a special-shaped bottom surface and the bottom surface of the material is a curved surface, and a lifting surface matching the bottom surface of the material 20 may be obtained in a manner of the main control terminal setting the lifting height of each lifting robot 10. However, at this time, the lifting height of each lifting robot 10 needs to be preset, which requires a large amount of calculation. If the control mechanism 100 within the single lifting robot 10 is used to stop the lifting mechanism 3 to control the lifting height of the tray 4, the control mechanism 100 stops the lifting mechanism 3 from moving when the tray 4 abuts against the material 20. In this way, the lifting height of each lifting robot 10 does not need to be preset, but the detection component is required to monitor the lifting state of the lifting robot 10 in real time. In practice, the specific lifting manner of the lifting mechanism 3 may be chosen according to the number of robots in the combined lifting robot group, the size of the material 20 and the shape of the bottom surface of the material 20.

What is claimed is:

1. A lifting robot, comprising a housing and a tray, wherein the housing comprises a side wall formed by a plurality of enclosing side panels, a projection of the side wall on a horizontal plane is a regular polygon, and at least one of the plurality of enclosing side panels is provided with a connection device for connecting to a side panel of another lifting robot, such that the lifting robot and at least one other lifting robot connect together to form a lifting surface with a target shape and a target size in a circumferential way by at least one connection device.

2. The lifting robot of claim 1, wherein the connection device is a magnetic tile.

3. The lifting robot of claim 1, further comprising a lifting device configured to drive the tray to raise or descend.

4. The lifting robot of claim 1, wherein the regular polygon is a square or a regular hexagon.

5. The lifting robot of claim 1, wherein a number N of the plurality of side panels of the side wall is such that $2N/(N-2)$ is an integer.

6. The lifting robot of claim 1, wherein a projection of the tray on the horizontal plane has a same shape as a projection of the side wall.

7. The lifting robot of claim 1, further comprising an information transmission device configured to enable internal and external communication of the lifting robot, wherein the information transmission device comprises a data interface disposed on at least one of the plurality of side panels.

8. The lifting robot of claim 1, further comprising a display device, which comprises:
    an operation display device, configured to display whether the lifting robot is operating; and
    a lifting display device, configured to display whether the lifting robot is lifting a material.

9. The lifting robot of claim 1, further comprising a detection device, which comprises a material detection device configured to detect material information, the material information comprising at least one selected from the group consisting of: position information, size information, and bottom surface shape information.

10. The lifting robot of claim 9, wherein the detection device further comprises:
    a lifting detection device, configured to detect a distance between the tray and a bottom surface of a material, and a lifting state of the tray.

11. A robot system, comprising a plurality of lifting robots, wherein each of the plurality of lifting robots comprises a housing and a tray, the housing comprises a side wall formed by a plurality of enclosing side panels, a projection of the side wall on a horizontal plane is a regular polygon, and at least one of the plurality of enclosing side panels is provided with a connection device, wherein at least one side panel of each of the plurality of lifting robots is connected to a side panel of another lifting robot in the robot system by the connection device, such that the plurality of lifting robots connect together to form a lifting surface with a target shape and a target size in a circumferential way by at least one connection device.

12. The robot system of claim 11, wherein in response to the plurality of lifting robots lifting a same material, the tray of the each of the plurality of lifting robots has different lifting height.

13. The robot system of claim 11, wherein the connection device is a magnetic tile.

14. The robot system of claim 11, wherein the each of the plurality of lifting robots comprises a lifting device configured to drive the tray to raise or descend.

15. The robot system of claim 11, wherein regular polygon is a square or a regular hexagon.

16. The robot system of claim 11, wherein a number N of the plurality of side panels of the side wall of each of the plurality of lifting robots is such that $2N/(N-2)$ is an integer.

17. The robot system of claim 11, wherein a projection of the tray on the horizontal plane has a same shape as a projection of the side wall.

18. The robot system of claim 11, wherein the each of the plurality of lifting robots further comprises an information transmission device configured to enable internal and external communication of the lifting robot, the information transmission device comprising a data interface disposed on at least one of the plurality of side panels of the lifting robot.

19. The robot system of claim 11, wherein each of the plurality of lifting robots further comprises a display device, which comprises:
    an operation display device, configured to display whether the lifting robot is operating; and
    a lifting display device, configured to display whether the lifting robot is lifting a material.

20. The robot system of claim 11, where the each of the plurality of lifting robots further comprises a detection device, which comprises a material detection device configured to detect material information, the material information comprising at least one selected from the group consisting of: position information, size information, and bottom surface shape information.

* * * * *